United States Patent [19]  [11] Patent Number: 4,641,988
Ganner  [45] Date of Patent: Feb. 10, 1987

[54] FITTING FOR RELEASABLY JOINING TWO STRUCTURAL COMPONENTS

[76] Inventor: Erwin Ganner, Weissenbachstrasse 21, A-6410 Telfs, Austria

[21] Appl. No.: 563,383
[22] PCT Filed: Jul. 19, 1982
[86] PCT No.: PCT/AT82/00022
§ 371 Date: Nov. 18, 1983
§ 102(e) Date: Nov. 18, 1983
[87] PCT Pub. No.: WO83/03287
PCT Pub. Date: Sep. 29, 1983

[30] Foreign Application Priority Data

Mar. 18, 1982 [AT] Austria ................................. 1076/82
May 18, 1982 [AT] Austria ................................. 1961/82

[51] Int. Cl.[4] ............................ B25G 3/00; F16B 9/00
[52] U.S. Cl. ..................................... 403/245; 403/322; 403/407.1; 403/405.1; 52/285
[58] Field of Search ................... 403/407.1, 405.1, 231, 403/245, 187, 6, 12, 266, 322; 52/285

[56] References Cited

U.S. PATENT DOCUMENTS

| 3,331,623 | 7/1967 | Baresel-Bofinger | 403/231 |
| 3,730,568 | 5/1973 | Giovannetti | 403/245 |
| 4,047,822 | 9/1977 | Lehmann | 52/285 X |
| 4,131,376 | 12/1978 | Busse | 403/12 |
| 4,160,610 | 7/1979 | Austen-Brown et al. | 403/231 |
| 4,272,207 | 6/1981 | Lautenschläger | 403/231 |
| 4,325,649 | 4/1982 | Röck | 403/231 |
| 4,332,495 | 6/1982 | Bürgers | 403/6 |
| 4,348,130 | 9/1982 | Lautenschläger | 403/407 X |
| 4,373,829 | 2/1983 | Baraxell | 403/266 |
| 4,408,923 | 10/1983 | Kubler | 403/407 X |
| 4,583,446 | 4/1986 | Salice | 403/407.1 X |

FOREIGN PATENT DOCUMENTS

| 294362 | 11/1971 | Austria . |
| 1215881 | 3/1966 | Fed. Rep. of Germany . |
| 2406405 | 3/1979 | France . |
| 1138177 | 12/1968 | United Kingdom . |
| 2119052 | 11/1983 | United Kingdom . |

Primary Examiner—Cornelius J. Husar
Assistant Examiner—Todd G. Williams
Attorney, Agent, or Firm—Toren, McGeady, Stanger, Goldberg & Kiel

[57] ABSTRACT

For releasably joining two structural components (1,2), particularly plate-shaped structural components which extend at a right angle relative to one another, a fitting has a preferably cylindrical locking element which can be inserted either directly in a bore (4) in the first structural component (1) or it can be inserted indirectly in a housing, and a holding piece (5) with a holding projection (7) anchored in the second structural component (2). In the assembled position, the holding projection 7 abuts against one or two gripping surfaces (8) of the locking element (3) which gripping surfaces (8) are of, for example, eccentric shape, and the holding projection (7) is pulled toward the locking element when the locking element (3) is turned. The holding piece (5) is constructed plate-shaped and is insertable in a slot (6) in the second structural component (2).

12 Claims, 17 Drawing Figures

FITTING FOR RELEASABLY JOINING TWO STRUCTURAL COMPONENTS

BACKGROUND OF THE INVENTION

The invention relates to a fitting for releasably joining two structural components, particularly two plate-shaped components which extend at a right angle relative to one another, in furniture with a preferably cylindrical locking element arranged directly in a bore in the first structural component or indirectly in a housing, and with a holding piece which can be anchored in the second structural component, the holding piece having a holding projection which abuts in the assembled position against one or two gripping surfaces of the locking element, the gripping surfaces being, for example, eccentric-shaped, and which holding projection is being pulled toward the locking element when the locking element is turned. The invention further relates to a holding piece for such a fitting.

Fittings of this type are described, for example, in German Auslegeschrift No. 26 25 182 and in Austrian Pat. No. 294 362. These documents show a cylindrical locking element with two eccentric gripping surfaces, wherein the head of a bolt-shaped holding piece abuts against the gripping surfaces. The cylindrical locking element can either be inserted directly in a flat-sided bore of the furniture plate, as illustrated in the Austrian patent, or it can be in the furniture plate by means of a housing.

From Austrian Pat. No. 285 101 there is known a fitting in which the bolt-shaped holding piece is held by a locking element which has a helically extending contact surface.

All known fittings of this type have in common a boltlike holding piece which cooperates with the locking element and is fastened in the other plate-shaped structural component. The holding piece of these fittings is, for example, a tightening screw or dowel, or an expansion bolt with expansion dowel.

These fittings provide a releasable connection of two plate-shaped furniture components, however, they are not sufficient for ensuring the stability of a piece of furniture. Generally, such fittings will be provided at the four corners of the horizontal furniture component and alignment dowels, for example, glued wooden dowels will be provided between always two fittings distributed along the depth of the piece of furniture.

Another system for joining two plate-shaped furniture components provides for laminated plates which respectively project half into slots cut into the two furniture components and which are, for example, glued to the latter.

While this connection is no longer releasable, it has the advantage, in non-industrial, i.e., hand-work, production of furniture, that the positioning of the small plates does not have to be as exact as the placing of the dowels or the drilling of dowel holes. In addition, marking can be performed more easily on plate-shaped structural components. Therefore, this type of furniture connection is wide-spread, particularly among joiners.

SUMMARY OF THE INVENTION

It is the object of the invention to provide a fitting of the above-mentioned type, which has the additional advantage that the holding piece can be positioned more easily and in which, furthermore, connecting plates can be used instead of alignment dowels without the requirement of an additional tool change.

These objects of the invention are achieved by constructing the holding piece in the shape of a plate and by making the holding piece insertable into a slot in the second structural component.

Another object of the invention is to provide a holding piece which can be anchored in the furniture component especially well in order to be able to absorb the clamping forces of the locking element. In accordance with the invention, this is achieved by constructing the whole piece in the shape of a plate or disc and by making it insertable in a slot in the second structural component. In this embodiment it is prevented that, when the plate is inserted in the groove, or slot glue is pressed out of the groove or slot at both ends of the plate.

The holding projection is advantageously arranged in the manner of a screw head on a bolt portion of the holding piece.

Holding pieces which are constructed lens-shaped or disc shaped in the side view have been proved particularly useful.

The deflecting webs advantageously project freely from the plate-shaped holding piece and the deflecting webs are elastic.

An embodiment provides that the width of the deflecting ribs corresponds approximately to the width of the groove and is wider than the thickness of the plate-shaped holding piece, wherein, advantageously, the side surfaces are knobs which are located in a plane with the side edges of the deflecting webs.

As a result of the construction of the holding piece in accordance with the invention, the glue is deflected by the deflecting ribs and is distributed over the sides of the laminated body.

An embodiment of the invention provides that the holding piece on the side facing the locking element has two circular arc-shaped edge sections which are spaced apart at the holding projection in the direction toward the locking element. As a result, it is possible that the holding piece can be constructed in one piece of plastics material while it still has a sufficient strength.

Another embodiment of the invention provides that the holding projection is constructed in two pieces, wherein a piece is arranged on either side of the holding piece.

For a better anchoring of the holding pieces, it is provided that their side surfaces are provided with grooves.

The grooves may advantageously result in a waffle pattern.

Another embodiment provides that the holding piece is provided, preferably on both sides, with a projecting support web, wherein the support webs are particularly provided at the middle of the holding piece.

As a result of this embodiment, it is not necessary to observe an exact measurement when cutting the slots which receive the holding pieces. The holding pieces abut laterally with the support webs against the plate surfaces.

In the following, embodiments of the invention are described in detail with the aid of the Figures of the drawing. The invention is not to be limited to these embodiments. In addition, the reference numerals used in the subsequent claims are not to represent a limitation, they merely serve to easily locate the parts referred to in the Figures of the drawing.

DETAILED DESCRIPTION OF THE INVENTION

Figure 1:
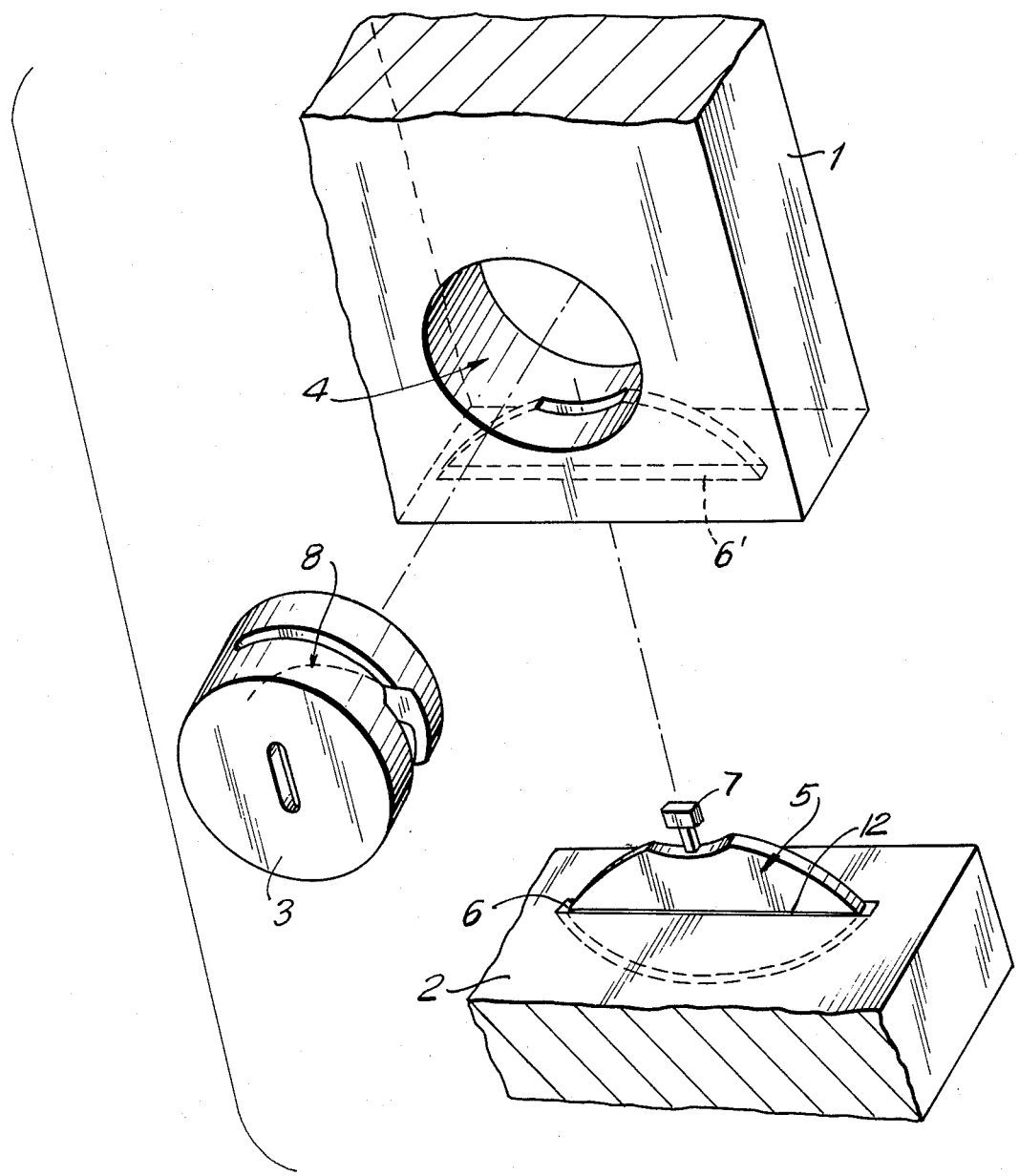
FIG. 1 shows schematically and exploded a diagram of the furniture connector according to the invention.
Figure 17:
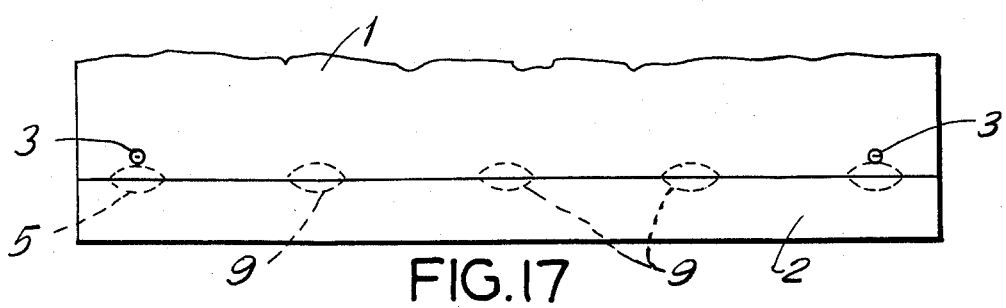
FIG. 17 shows schematically the assembled structural components.

In FIGS. 1 and 17, the plate-shaped structural components to be connected to one another are denoted by reference numerals 1 and 2, wherein, in the illustrated embodiment, the cylindrical locking element 3 is inserted directly into a flat-ended bore 4 in structural component 1.

The plate-shaped or disc shaped holding piece 5 is also inserted flat-sided in the structural component 2 in a slot-shaped milled cut 6. The holding piece 5 is advantageously glued in the component 2.

Structural component 1 is also provided with a milled cut or slot 6' into which projects the head 7 of the plate-shaped holding piece 5 when the structural components 1, 2 are placed on one another, wherein the head 7 projects into the locking element 3 where it abuts against the gripping surfaces 8 of the latter.

By turning the locking element 3, the head 7 and, thus, the holding piece 5 are pulled into the locking element 3 in a conventional manner, resulting in a firm grip or engagement between the two structural components 1 and 2.

As can be seen from FIG. 17, a fitting according to the invention is respectively provided in the front and back as seen in the depth of the piece of furniture. Plate-shaped connectors 9 are inserted between the two fittings in the conventional manner, the connectors 9 each projecting half in the structural component 1 and half in the structural component 2. The cuts for the connectors 9 and for the holding pieces 5 can be carried out with one and the same milling tool in a continuous process of work.

Figure 2:
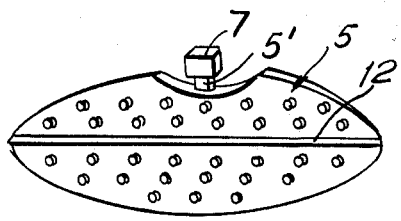
FIGS. 2 to 5 show side views of various holding pieces.
Figure 3:
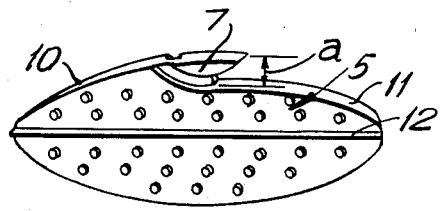
Figure 4:
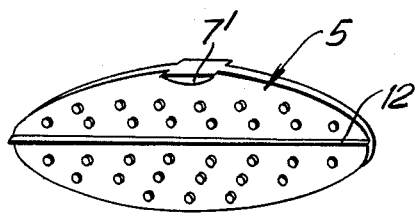

FIGS. 2 to 4 show different embodiments of the holding piece 5; in FIG. 2, the holding piece 5 has a bolt portion 5' at whose end there is arranged a screw head-like holding projection 7. The bolt portion 5' with holding projection may be a metal part which is cast into the plastics material of the holding piece 5.

In the embodiment according to FIG. 3, the holding piece 5 has two circular arc-shaped edge sections 10, 11 which are arranged at the holding projection 7 spaced apart by the distance a, so that the engagement of the locking element 3 is possible.

In the embodiment according to FIG. 4, the holding projection 7 is constructed in the form of two holding pieces 7' which are arranged on the sides of the plate-shaped holding piece 5.

Figure 7:
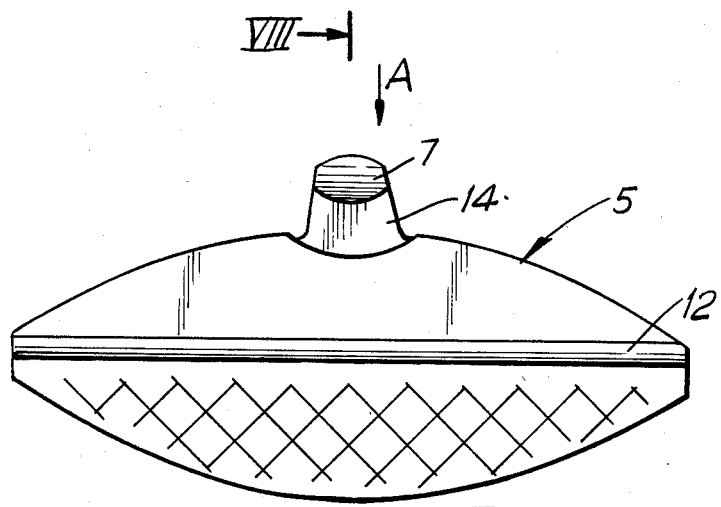
FIG. 7 shows a side view of another embodiment of a holding piece.
Figure 8:
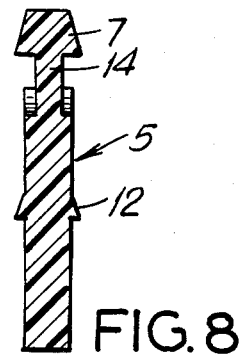
FIG. 8 shows a sectional view taken along the line VIII—VIII in FIG. 7.
Figure 9:
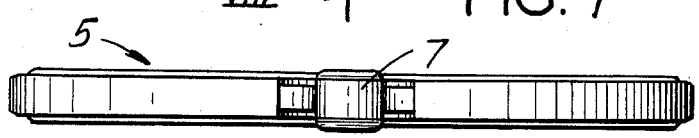
FIG. 9 shows a view from the direction of arrow A of FIG. 7.

FIGS. 7 to 9 show a holding piece 5 in which there is formed at the holding projection 7 a web 14 which is narrower relative to the remaining holding piece 5. This embodiment also makes it possible to construct the holding piece 5 entirely of a piece of plastics material and to achieve the necessary strength.

Figure 5:
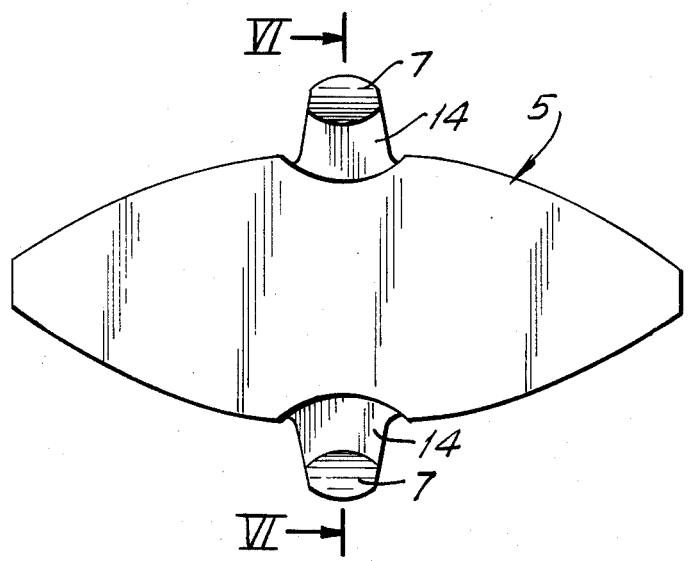
Figure 6:
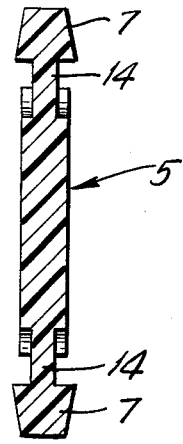
FIG. 6 shows a sectional view taken along line VI—VI of FIG. 5.

FIGS. 5 and 6 show a holding piece 5 of symmetrical design with two holding projections 7. This holding piece 5 is intended for joints in which the structural components 1, 2 are not extending at a right angle to one another but in the same plane. A locking element 3 engages each holding projection 7.

Figure 10:
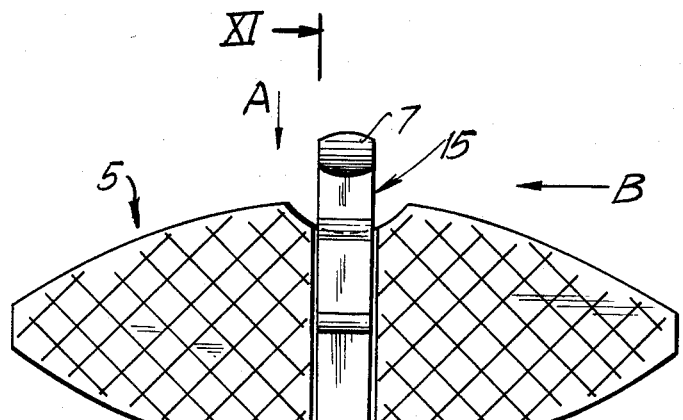
FIG. 10 shows a side view of another embodiment of a holding piece.
Figure 11:
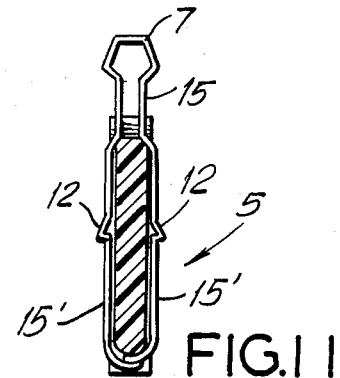
FIG. 11 is a sectional view taken along the line XI—XI in FIG. 10.
Figure 12:
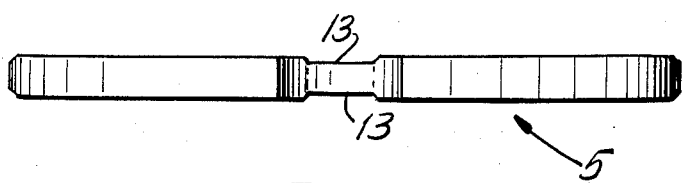
FIG. 12 shows a view from the direction of arrow A of FIG. 10.
Figure 13:
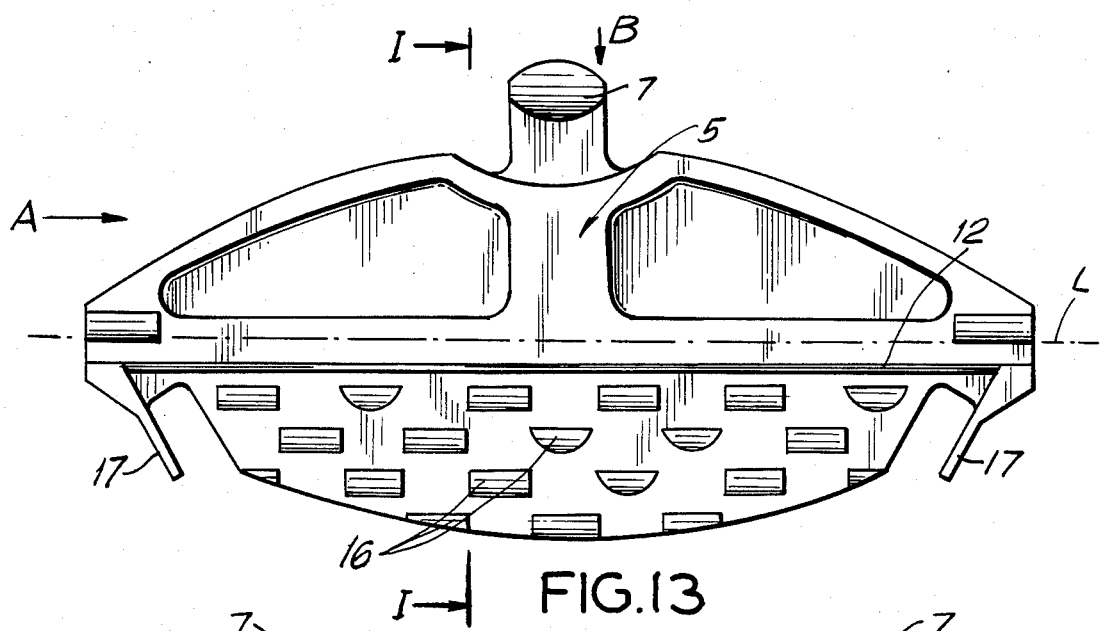
FIG. 13 shows a side view of another embodiment of a holding piece.

In the embodiment according to FIGS. 10 to 12, the holding projection 7 is supported by a metal clamp 15. The metal clamp 15 is made, for example, of sheet steel and has two stirrups 15' which, as can be seen particularly in FIG. 11, are bent around the plate-shaped body of the holding piece 5. The plate-shaped body of the holding piece 5 may be made of plastics material, but can also be punched from wood. The plate-shaped body advantageously has grooves 13 in which the stirrups 15 are placed.

As already mentioned, the side surfaces of the holding pieces 5 may be ribbed in various ways or may be constructed in another manner in order to ensure a better anchoring in the milled cut or slot 6. The holding pieces 5 can also be provided with holes in order to facilitate a better gluing.

To ensure that the holding pieces 5 cannot be inserted too deeply in the structural components, they are provided with lateral support webs 12 which laterally abut against the surface of structural component 2. Accordingly, the extent to which the holding projection 7 is arranged above the structural component 2 and, thus, the extent to which it extends into the structural component 1 are exactly defined.

FIGS. 13 to 16 show another embodiment of a holding piece 5.

On that side which is inserted and glued into the groove 6 of the plate-shaped structural component 2, the holding piece 5 is provided with lateral, rectangular or rounded knobs 16 which improve the grip of the holding piece 5 in the structural component 2.

The holding piece 5 is provided at both its ends with the deflecting webs 17 according to the invention for the glue which project freely in the illustrated embodiment. Due to the plastics material of which the holding piece 5 is made, these webs 17 are slightly elastic leaf-like pieces.

The width B of the deflecting webs 17 preferably corresponds to the width of the milled cut or slot 6.

Figure 14:
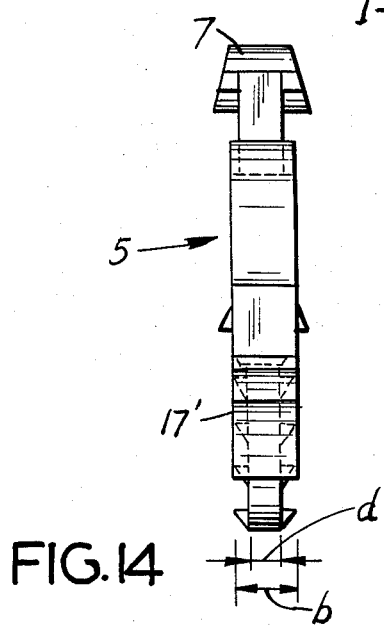
FIG. 14 shows a view from the direction of arrow A of FIG. 13.
Figure 15:
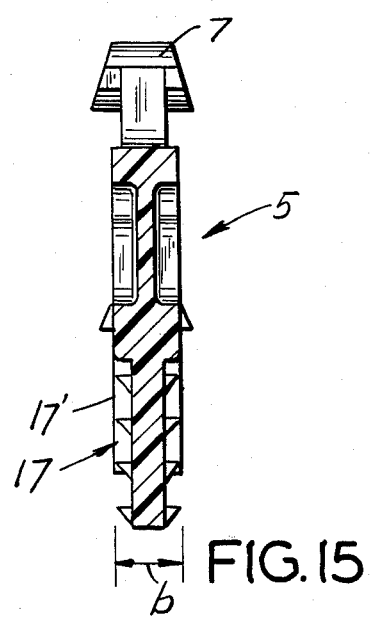
FIG. 15 shows a sectional view along the line I—I of FIG. 13.
Figure 16:
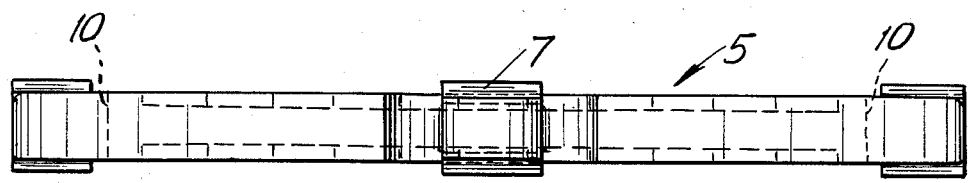
FIG. 16 shows a view from the direction of arrow B of FIG. 13.

The knobs 16 advantageously project from the actual side wall of the holding piece 5 to such an extent that their ends are located in one plane with the edges 17' of the deflecting ribs 17, as can be seen from FIGS. 14 and 15.

The deflecting ribs 17 according to the invention prevent the glue from being forced laterally out of the slot 6 at the ends of the holding piece 5 when the holding piece 5 is inserted into the slot 6; instead, the glue is deflected and distributed over the sides of the holding piece 5.

Even though this holding piece 5 is used with particular advantage in a furniture connector according to the invention, the invention can also be utilized in a conventional holding piece or holding plate, i.e., in a holding plate which is constructed with mirror-image symmetry relative to its longitudinal median plane LL and is glued on both sides into the corresponding structural component.

I claim:

1. Fitting assembly for releasably joining furniture parts comprising a first and a second plate-shaped structural furniture component with said components extending at right angles to one another, said first and second components each having a pair of opposite surfaces and an edge surface extending transversely of the opposite surface, said first structure component having a bore therein extending at least from one opposite surface toward the other opposite surface and spaced from the edge surface of said first structural component, an axially extending cylindrical locking element fitted into the bore in said first structural component and being rotatable in said bore about the axis of said locking element, said second structural component having a slot formed in only one of the pair of opposite surfaces and edge surface, a holding piece fixedly secured in the slot formed in the surface of said second structural component and said holding piece projecting perpendicularly outwardly from the surface containing the slot, said holding piece having a holding projection thereon on the part of said holding piece projecting outwardly from said second structural component, the edge surface of said first structural component has a slot formed therein and extending inwardly from the edge surface thereof and being open to the bore in said first structural component, said locking element has at least one gripping surface thereon, said holding piece being insertable into the slot in the edge surface of said first structural component with said holding projection extending into the cross-section of said bore in said first structural component, said locking element being rotatable within said bore so that said at least one gripping surface thereon engages said holding projection and pulls said holding piece into the slot in said first structural component toward the locking element, and said holding piece is a disc-like member having a pair of opposite flat sides and an edge surface defining the boundary of said flat sides and with said holding projection extending outwardly from said edge surface thereof in the direction extending perpendicularly to the surface in which the disc-like member is secured in said second structural component, said slots in said first and second structural components having flat side surface, and said flat sides of said holding piece being disposed in generally parallel relation with the sides of said slots.

2. Fitting according to claim 1, characterized in that said holding projection (7) is arranged as a screw head on a bolt portion (5') projecting from the edge surface of said holding piece (5) with said screw head spread transversely outwardly from the bolt portion in the direction extending between the flat sides of said holding piece.

3. Fitting according to claim 1, characterized in that said holding piece (5) has on the edge surface facing said locking element (3) two circular arc-shaped edge sections (10,11) which are spaced apart at a distance (a) at said holding projection (7) in the direction toward said locking element (3).

4. Fitting according to claim 1, characterized in that said holding projection (7) includes two parts (7', 7') each projecting laterally outwardly from said holding piece (5).

5. Fitting according to claim 1 characterized in that said flat sides of said holding piece are formed with a waffle pattern.

6. Fitting according to claim 1 characterized in that said holding piece (5) is provided with an outwardly projecting support web (12) on each of said flat sides.

7. Fitting according to claim 6 characterized in that said support webs (12) are formed equidistantly from the edge surface of said holding piece (5) and extending generally parallel to the surface of said second component in which the slot is formed.

8. Fitting according to claim 1, characterized in that said holding piece has a pair of ends on said edge surface spaced laterally from said holding projection and on at least the edge surface which is insertable in said slot (6) of second structural component (2), said holding piece (5) is provided at both ends thereof with deflecting webs (17) for glue used to secure said holding piece in said second structural component.

9. Fitting according to claim 8, characterized in that said deflecting webs (17) project freely from the edge surface of said disc-shaped holding piece.

10. Fitting according to claim 9, characterized in that said deflecting webs (17) are elastic.

11. Fitting according to claim 8, characterized in that said deflecting webs have a width (b) extending in the direction between the opposite flat sides of said holding piece corresponding approximately to the width of said slot (6) and the width (b) is greater than the thickness (d) between the flat sides of said disc-like holding piece (5).

12. Fitting according to claim 11, characterized in that knobs (16) are provided at the flat sides of said holding piece (5) with said knobs (16) projecting outwardly from said flat sides to such an extent that they are located in a common plane with the edge (17') of said deflecting webs (10) extending generally parallel with the flat sides of said holding piece.

* * * * *